Aug. 4, 1964

C. L. EKSERGIAN 3,143,379

BRAKE PRESSURE PROPORTIONING DEVICE

Filed Dec. 18, 1961

INVENTOR.
Carolus L. Eksergian.
BY
Harness, Dickey & Pierce.
ATTORNEYS.

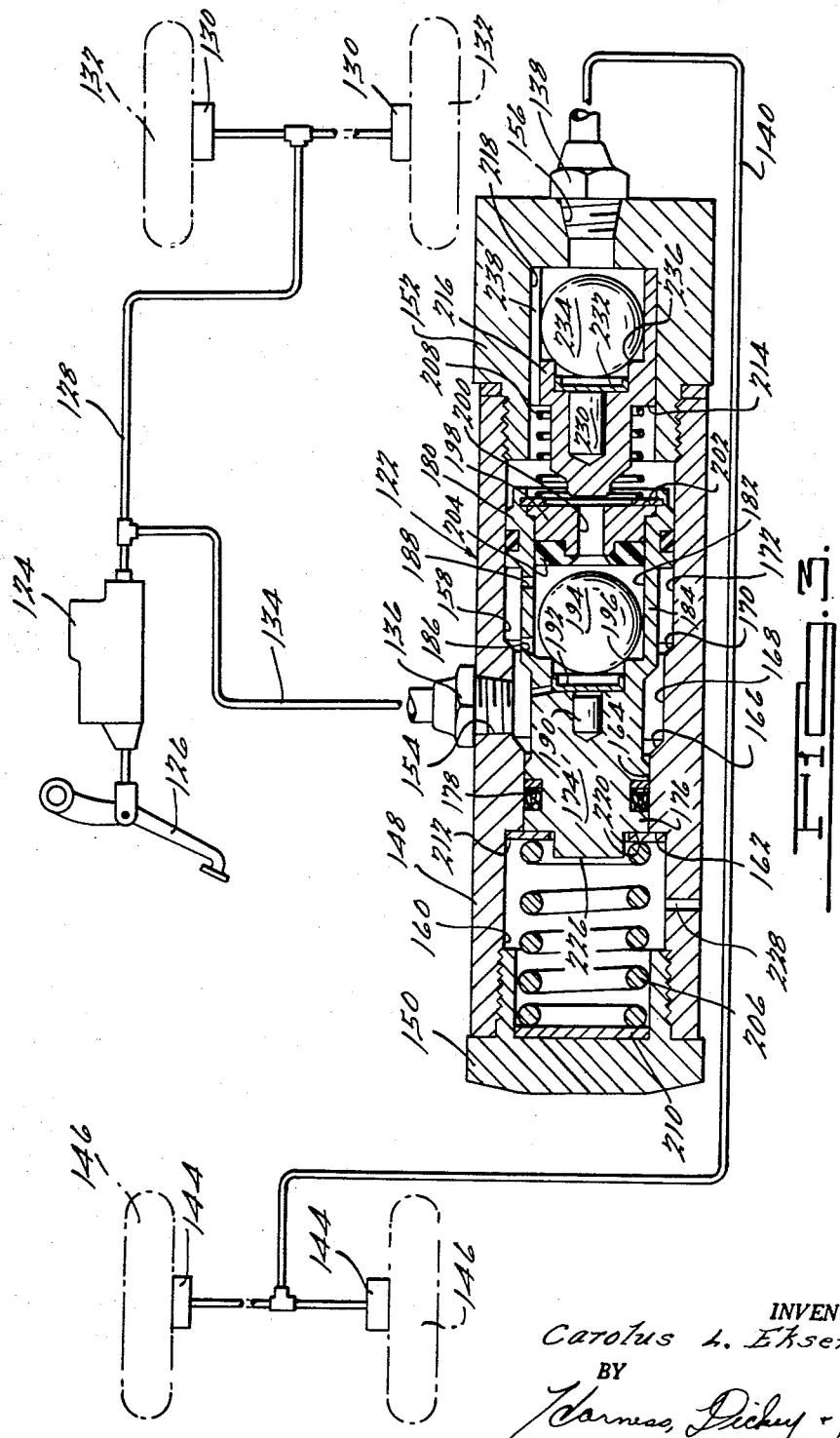

United States Patent Office 3,143,379
Patented Aug. 4, 1964

3,143,379
BRAKE PRESSURE PROPORTIONING DEVICE
Carolus L. Eksergian, Media, Pa., assignor to Kelsey-Hayes Company, Romulus, Mich., a corporation of Delaware
Filed Dec. 18, 1961, Ser. No. 159,987
5 Claims. (Cl. 303—24)

This invention relates to hydraulic brake systems for vehicles and particularly to a device for limiting the brake pressure delivered to the rear brakes of a vehicle in proportion to the shift in weight distribution from the rear to the front wheels produced by rapid deceleration of the vehicle.

It is well known that the effective braking effort of which a vehicle wheel is capable is dependent upon the weight carried by that particular wheel. In front engine passenger cars, the greater proportion of weight is normally borne by the front wheels and, for this reason, the pistons of the front wheel brake cylinders in the hydraulic brake system are usually made somewhat larger than the pistons of the rear wheel brake cylinders. By this means, pressure delivered to the brake cylinders from a common master cylinder will produce a greater braking force on the shoes of the front brakes than is applied to the shoes of the rear brakes. However, it is well known that the proportion of the vehicle's weight that is borne by the wheels of a given axle or a given pair of wheels does not remain static. As the vehicle is braked, a couple is developed about the center of gravity of the car, which results in a percentage of the weight of the car borne by the rear wheels being transferred to the front wheels. The amount of the weight transfer for a given vehicle is dependent upon the magnitude of the deceleration. In recognition of this fact, various devices have heretofore been proposed which are responsive to deceleration and which serve to limit the brake pressure applied to the rear wheels upon the attainment of a predetermined rate of deceleration. The apparent object of such devices is to permit the greatest application of braking pressure to the front wheels before skidding will result at the rear wheels. Premature rear wheel skidding substantially reduces the coefficient of friction between the rear wheels and the ground, which can result in loss of control of the vehicle. When the rear wheels skid first, they tend to overrun the front wheels and cause spin. It is therefore highly beneficial to the maintenance of control of the vehicle during braking to assure that the rear wheels do not skid prior to the front wheels. On the other hand, the maximum braking effort of which both front and rear wheels are capable must be utilized if the vehicle is to be stopped within the shortest possible distance.

The change in weight borne by the front and rear wheels of a given vehicle may be graphically plotted as a function of deceleration and the ideal distribution of braking force to the front and rear wheels will be established by the resultant curve. While the wheel base of the vehicle and the height of the center of mass above ground level will determine the change in weight distribution produced by each unit of deceleration, these factors are fixed for any given vehicle. The change in weight of a particular vehicle is, therefore, a direct function of deceleration. Assuming a given static weight distribution, the weight transfer for each unit of deceleration may be determined and the resultant weight distribution at each rate of deceleration graphically plotted. In an ideal brake system, the proportion of brake force applied to the front and rear wheels should be varied to approximate this known change in weight distribution as closely as possible. Only by so doing is it possible to utilize the available adhesion between the road and the tires so that the front and rear wheels exert the maximum braking effort of which they are capable. While it may be assumed that the production of a system capable of a mathematically exact duplication of the ideal curve is not feasible in a reasonably priced and commercially salable system, devices heretofore produced have produced marked undesirable deviations from the ideal curve. Accordingly, it is an object of the present invention to provide a brake proportioning device which is operable to proportion the braking force of the front and rear wheels of a vehicle in a manner closely approximating the transfer of weight distribution from the rear to the front wheels produced by deceleration of the vehicle.

It is another object of the present invention to provide a device of the above character which is reliable in operation, which is inexpensive of manufacture and is ruggedly constructed.

It is another object of the present invention to provide a brake pressure proportioning device which may be conveniently inserted in the fluid conduit leading to the rear wheels to limit the proportion of front to rear wheel braking force in accordance with the proportion of the weight of the vehicle borne by said wheels.

It is another object of the present invention to maintain a close approximation of the ideal braking efforts at the front and rear wheels, and without marked interruptions in the delivery of brake pressure to the rear wheels which has been present in prior brake proportioning devices.

It is a further object of the present invention to provide a vehicle brake pressure proportioning device operable to assist the driver in maintaining control of the vehicle during braking under all conditions of road adhesion by avoiding premature rear wheel skidding.

These and other objects of the present invention will become apparent from the following detailed description taken in conjunction with the accompanying drawings wherein:

FIG. 3 is a view of structure similarly illustrated in FIGURE 1 showing another form of the present invention.

Figures 1, 2:
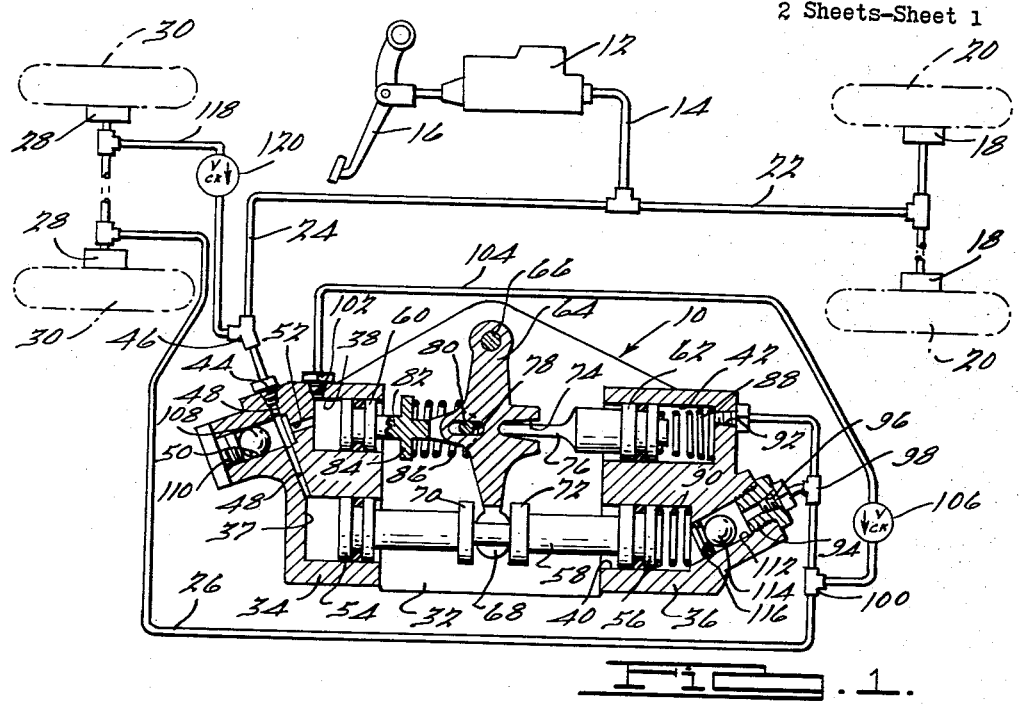
FIGURE 1 is an axial sectional view of a brake proportioning device embodying the features of the present invention and showing its manner of connection to a schematically illustrated brake system.
FIG. 2 is a graph showing the actual and ideal braking efforts as a function of deceleration.

Referring now to the drawings, FIGURE 1 shows the proportioning device 10 and its manner of connection in a diagrammatically illustrated braking system. A fluid motor in the form of the usual master cylinder is illustrated at 12 for the delivery of pressurized fluid to a conduit 14 upon the operation of a brake pedal 16. Brake fluid is delivered from the conduit 14 to the brake cylinders 18 of front wheels 20 through a conduit 22. Brake fluid is also free to flow from the conduit 14 through a conduit 24 to the proportioning device 10. Fluid pressure is delivered from the proportioning device 10 through a conduit 26 to the brake cylinders 28 of the vehicle rear wheels 30.

While the proportioning device 10 may be made in various standard shapes, the device illustrated in FIGURE 1 includes a frame 32, provided with housing portions 34 and 36. The housing portion 34 has a pair of parallel piston bores 37 and 38, while the housing portion 36 has a pair of piston bores 40 and 42 axially aligned with the bores 37 and 38, respectively. Incoming fluid enters the housing portion 34 through an inlet 44, which is connected to the conduit 24 by means of a Y fitting 46. From the inlet 44, incoming fluid flows through a passage 48 which extends into the bore 37 and is open to an inclined chamber 50. The chamber 50, in turn, communicates with the piston bore 38 through a passage 52.

A piston 54 is disposed in the piston bore 37 and a piston 56 is positioned in the piston bore 40. The pistons 54 and 56 are rigidly interconnected by a rod 58 for mutual reciprocatory movement. A piston 60 is located in the piston bore 38 and a piston 62 is disposed in the piston bore 42. The several sets of pistons are mechanically coupled by a lever arm 64 which is pivotally mounted on the frame 32 by a pivot pin 66 between the housing portions 34 and 36. The lower end of the lever arm 64 is provided with a rounded portion 68 which extends through a slot formed in the rod 58 between shoulder portions 70 and 72 thereon. The lever arm 64 is further formed with a recess 74 on one side thereof which is adapted to receive an extension 76 formed on the piston 62. Directly opposite the recess 74, the lever arm has an elongated slot 78 receiving a pin 80 formed on a piston rod 82 integrally connected to the piston 60. The piston rod 82 also has a flange 84 which forms a seat for one end of a coil spring 86, the other end of which bears against the lever arm 64. The extension 76 is maintained in engagement with the recess 74 by a light-weight spring 88, while another light-weight return spring 90 is positioned in the piston bore 40 and serves to return the pistons 54 and 56 to a left-hand position in the absence of braking pressure. The springs 88 and 90, taken together, are of substantially less strength than the spring 86.

Fluid is normally maintained in the bores 42 and 40. Fluid is discharged from the bore 42 to the conduit 26 through an outlet 92, while the housing portion 36 is provided with a plug 94 having an outlet 96 for the discharge of fluid from the bore 40 to the conduit 26 through a fitting 98. It will be seen that the conduit 26 is also provided with a T fitting 100, which is connected to a port 102 in the housing portion 34 by means of a conduit 104. The port 102 communicates with the bore 38 and provides fluid communication between the inlet and outlet sides of the entire piston means. It will be seen, however, that the conduit 104 has a check valve 106 inserted therein which prevents the reverse flow of fluid from the fitting 100 to the port 102.

During normal operation of the device, incoming fluid flows through the ports 48 and 52 into the bores 37 and 38 to apply a force to the lever arm 64 in a counter-clockwise direction. This force tends to displace the pistons 56 and 62 in a direction toward the outlets 92 and 96, that is, in a direction displacing fluid through said outlets. In so doing, the spring 86 is compressed between the lever arm 64 and the flange 84, while the pin 80 is free to move in the slot 78. The spring 86 is thereby loaded with a force equal to the force exerted on the piston 60. The pistons 54 and 60 being of equal diameter to the pistons 56 and 62, brake pressure would be transmitted between the housings 34 and 36 in a 1:1 ratio even in the absence of the conduit 104, which provides a direct fluid connection between the inlet and outlet during normal driving or the application of light braking pressures which do not result in a deceleration in excess of a predetermined amount. When the vehicle is braked heavily, however, a combined inertia and valve member in the form of a ball 108 will roll up the inclined wall of the chamber 50 to seal off the mouth of the passage 52 and prevent the admission of further inlet braking pressure to the bore 38. Inlet braking pressure is still free to flow through the passage 48 into the bore 37, however. It will be seen that, during normal driving, the ball 108 rests upon a plug member 110 which closes off one end of the bore 50. The device is intended to be mounted on the vehicle with reference to a horizontal plane as illustrated on the drawing sheet and with the wall of the chamber 50 inclined upwardly toward the front of the vehicle. It will therefore be seen that the inclined wall of the chamber 50 and the location of the mouth of the passage 52 at the upper end of the chamber 50 are such that the ball 108 is normally maintained free of the passage 52. After actuation or operation of the combined inertia and valve member 108, pressure from the master cylinder can only be delivered to the rear wheel brake cylinders 28 by displacement of the piston 54. As the piston 54 moves in a right-hand direction, as viewed in the drawing, it must displace both the pistons 56 and 62, which have a combined cross sectional area substantially twice that of the piston 54. Of course, the pistons may be proportioned in any desired manner, provided that the combined area of the pistons 56 and 62 is greater than the area of the piston 54. The force in pounds per square inch delivered by the pistons 56 and 62 being inversely proportional to the fluid displacing areas thereof, a one-half reduction in braking force would be encountered in the absence of the spring 86. However, at the instant of closure of the ball 108, the spring 86 is exerting a force on the lever arm 64 substantially equal to the force applied to the lever arm by the piston 54. The spring 86 is desirably a variable rate spring and, as it unloads with the continued movement of the piston 54, the force which it exerts upon the lever arm 64 will be reduced, so that the reduction in braking pressure occasioned by the change in the ratio of piston areas upon the closure of the ball 108 will be gradual rather than abrupt such that the resultant braking pressure may be made to closely approximate the curve representing the desired change in braking force by the proper selection of the spring 86.

It has been found that upon the attainment of too great a deceleration rate, the reduction in braking pressure delivered to the rear wheels will still be insufficient to prevent skidding of the rear wheels. Because at this time, the permissible increase in rear pressure is small, further increase may be stopped without unduly penalizing stopping distance. For this purpose, a chamber 112 is formed in the housing portion 36 between the bore 40 and the outlet 96. An inertia operated valve element in the form of a ball 114 is positioned in said chamber and normally rests against an apertured retainer member 116. It will be seen that the walls of the chamber 112 are upwardly inclined in a direction toward the outlet 96 in an amount greater than the inclination of the ball 108 of the chamber 50. Thus, the ball 114 will roll up the walls of the chamber 112 to seal off the outlet 96 only as a result of a deceleration greater than a deceleration sufficient to occasion closure of the ball 108. The angle of inclination required to produce closure of a ball at a given rate of deceleration may be computed by well known mathematical formulae and, thus, the device may be built to cause the balls 108 and 114 to close at any desired deceleration rates.

FIG. 2 is a graphic representation of the distribution of braking force for a given vehicle during deceleration. Line T represents the total braking effort or retarding force of both front and rear brakes. Lines F$s$ and R$s$ represent the relative retarding effort of the front and rear brakes in the absence of the proportioning device of the present invention. The difference in these lines may be considered to be the result of the use of different size pistons in the front and rear brake cylinders receiving fluid pressure from a common fluid motor to accommodate a static weight difference. Lines F$d$ and R$d$ represent the ideal relative retarding forces of the front and rear brakes during deceleration for producing maximum braking effort without premature skidding of one set of wheels. Lines F$d$ and R$d$ correspond to the maximum force possible with the adhesion available and the weight transfer which thereby results. It will be noted that the proportion of the retarding force of the rear brakes to the front brakes is reduced as deceleration is increased. Line C indicates the results produced by the use of the proportioning device of the present invention. Point $a$ on line C is the point at which the ball 108 closes. After this point, line C will continue upward but at a lesser rate than line R$s$ until point $b$ is reached, when ball 114 closes and thereafter prevents the application of additional braking force to the rear brakes. After closure of the ball 108, the spring 86, which is biasing the lever arm 64, adds its force to the force of the piston in displacing the pistons 56 and 62 and, thus, in pressurizing fluid in the rear brake cylinders. With continued movement of the pistons 54 and 56 and the lever arm 64, the force exerted by the spring 86 will be reduced and line C will be seen to drop away from line R$s$ in a manner approximating line R$d$. Thus, the spring 86, with its diminishing influence, provides a smooth and gradual transition in brake pressure between points $a$ and $b$.

FIG. 2 also shows in a dot-dash line the rear wheel braking effort that would result without the use of the spring 86 after closure of the ball 108 at point $a$. Line $d$ represents a plateau or static level of rear wheel braking effort which would result from the pistons 56 and 62 standing still until inlet fluid pressure acting against the piston 54 rises to a high enough level to offset the difference in area between the piston 54 and the combined areas of the pistons 56 and 62. When inlet fluid pressure would rise to such a high level to move the pistons 56 and 62, braking effort would then assume the form shown on line $e$. Lines $d$ and $e$ indicate a substantially greater departure from the ideal braking force than that achieved by the use of the spring 86 and, in fact, correspond to the results achieved in certain brake proportioning devices heretofore proposed.

Looking now at that portion of line R$d$ beyond point $b$, the curve of the line will be seen to be relatively flat and, therefore, the deviation of line C from line R$d$ after point $b$ is rather slight. Accordingly, the straight form which line C assumes after point $b$ will also closely approximate line R$d$. Furthermore, point $b$, at which the ball 114 closes, occurs at a rate of deceleration which is just slightly prior to a rate of deceleration which would normally produce rear wheel skidding and there is, therefore, very little additional braking effort beyond point $b$ which could be utilized as a practical matter, even in the absence of the ball 114.

From the foregoing, it will be seen that line C very closely approximates the ideal distribution of braking force to the rear wheel brakes. In devices heretofore produced, marked deviations from the ideal curve have been encountered, particularly immediately after the closure of the valve elements. However, the spring 86 of the present proportioning device is effective to continue application of braking pressure to the rear wheel brakes, but in gradually reduced proportion to the pressure delivered to the front wheel brakes.

FIG. 3 illustrates another form of the present invention in which a brake pressure proportioning device 122 is illustrated as being interposed in the conduit leading to the rear brake cylinders of a schematically illustrated brake system. A fluid motor in the form of a master cylinder is indicated at 124 as being operated by a brake pedal 126. Fluid is delivered from the master cylinder 124 through a conduit 128 leading to the brake cylinders 130 of the front wheels 132 of the vehicle, while pressurized fluid is delivered from the same source through a conduit 134 leading to an inlet fitting 136 of the proportioning device 122. Fluid is delivered from the device through an outlet fitting 138 connected to a conduit 140 leading to the brake cylinders 144 of the rear wheels 146.

The proportioning device itself includes a generally cylindrical housing 148 which is closed at its one end by an end closure member 150 and at its other end by an end closure member 152. An inlet opening 154 is formed in the side of the housing 148 in which the inlet fitting 136 is secured. An outlet opening 156 is formed in the end closure member 152 and receives the outlet fitting 138. The housing 148 has a central bore or chamber 158 which provides communication between the inlet 154 and the outlet 156. The bore 158 is symmetrical about its longitudinal axis and is of stepped diameter to provide axially successive bore portions of varying cross sectional area with shoulders formed intermediate said bore portions. These bore portions and shoulders include a bore portion 160, a shoulder 162, a bore portion 164, an inclined shoulder 166, a bore portion 168, a shoulder 170 and a bore portion 172. A piston 174 is carried within the bore 158 for axial reciprocatory movement and is provided with a portion 176 at one end thereof having a peripheral seal 178 sealingly engaging the wall of the bore portion 164. Similarly, an enlarged bore portion 180 is formed at the opposite end of the piston 174 and is provided with means sealingly engaging the wall of the bore portion 172. The end of the piston 174 adjacent the outlet opening is hollow to provide a chamber 182 defined by an annular wall 184 having a circumferentially arranged series of openings 186 and a circumferentially arranged series of openings 188 therethrough. A permanent magnet 190 is set within the piston 174 and held in place by a retainer 192. A steel ball 194 is positioned within the chamber 182 and is held against an annular edge or seat 196 by the field of the magnet 190. The right-hand end of the chamber 182 is fitted with a plug 198 having an opening 200 formed therein. The plug 198 is held in place by a snap ring 202 and has a resilient valve seat member 204 bonded to the end thereof adjacent the ball 194 and surrounding the opening 200. Thus, when the ball 194 is seated against the valve seat member 204, it will seal off the opening 200 to prevent fluid communication between the inlet 136 and the outlet 138.

In the absence of braking pressure, the piston 174 is located within the bore 158 by a heavy pre-compressed coil spring 206 and a light-weight return spring 208. The spring 206 is seated at one end against an annular shim 210 engaging the end wall of the end closure member 150 and at its opposite end against an annular shoulder member or washer 212 held flatly against the housing shoulder 162. The washer 212 extends radially inwardly of the wall of the bore portion 164 for engagement by a shoulder 220 of the piston 174 which is held against the washer 212 by the light-weight return spring 208 which is of substantially lesser strength than the heavy spring 206. As may be seen in the drawing, the return spring 208 is seated on a shoulder 214 of a body member 216 fitted within a bore 218 formed in the end closure member 152.

In use, the device 122 is mounted on the vehicle with the outlet 156 pointed toward the front of the vehicle and with the axis of the bore 158 arranged in a horizontal position. In the absence of braking pressure or upon the application of a braking pressure of insufficient magnitude to produce deceleration in excess of a predetermined rate, an open fluid path will be provided from the inlet 154, through the bore 158, through the openings 186 and 188, through the opening 200, past the body member 216 to the outlet 156. Under such conditions, the proportioning device has no effect upon the braking pressure delivered from the master cylinder to the rear wheel cylinders. During braking, however, brake pressure within the bore 158 acts upon the surfaces of the piston 174 and tends to displace the piston in a left-hand direction, compressing the spring 206. This action results from the fact that the shoulders and surfaces of the piston exposed to inlet fluid pressure which face in a generally right-hand direction are greater than the surfaces facing in a generally left-hand direction. When the force tending to move the piston in a left-hand direction exceeds the pre-compressed force of the spring 206, the washer 212 will be moved off of the shoulder 162 and the spring 206 will be further compressed. The spring 206 is preferably a variable rate spring, so that the spring will constantly resist further loading and will exert a force on the piston equal to the fluid force acting on the piston tending to move the piston in a left-hand direction. It will be seen that this force is equal to the inlet fluid pressure acting on an area equal to the cross sectional area of bore portion 162. The bore portion 160 in which the spring 206 is located is vented to atmosphere by a port 228 to prevent possible fluid compression within this bore portion.

During deceleration, the inertia of the ball 194 attempts to overcome the magnetic field of the magnet 190. When deceleration becomes great enough, the inertia of the ball 194 will cause the ball to overcome the force of the magnet 190 and seat against the valve seat member 204. The rate of deceleration required to unseat the ball from the edge 196 and close the opening 200 is, of course, determined by the strength of the magnet 190 which is selected. It will be noted that as the ball 194 moves away from the magnet, it becomes less influenced by its magnetic field and, thus, upon a slight reduction in the rate of deceleration, the ball will still remain closed. The ball is also held away from the magnet by the inlet fluid pressure which tends to force the magnet against the valve seat member 204.

After closure of the opening 200, fluid pressure at the inlet 154 is sealed off from fluid pressure at the outlet 156. Thus, further displacement of fluid to the rear wheel brake cylinders 144 through the outlet 156 can only be accomplished by movement of the piston 174 in a right-hand direction. It will be noted that the ball 194 has sealed off the right-hand end of the piston 174 from inlet fluid pressure. Thus, after closure of the ball 194, the surfaces of the piston 174 exposed to inlet fluid pressure are now such as to exert a force on the piston tending to move it in a right-hand direction. This force is supplemented by the force of the spring 206. Fluid pressure for producing right-hand movement acts upon an effective area which is equal to the cross sectional area of the bore portion 172 less the cross sectional area of the bore portion 164. It will be seen that the area of the piston tending to displace fluid from the outlet 156 is equal to the area of the bore portion 172 an amount which is substantially greater than the aforementioned effective area against which the inlet pressure operates. For this reason, in the absence of the spring 206, a substantial reduction in fluid pressure between the inlet and the outlet would result. This is because the ratio of the pressure transmitted by the piston 174 to pressure acting upon the piston is inversely proportional to the piston areas involved. It will be noted, however, that the spring 206 has been compressed with a fluid force acting over an effective area equal to the diameter of the bore portion 164. For this reason, at the moment of closure of the ball 194, the forces tending to displace the piston 174 in either direction will be substantially equal. Additional brake force at the inlet will be delivered to the outlet at the new ratio and, with right-hand movement of the piston 174, the contribution of spring 206 will be reduced. It is intended that desired braking of the vehicle will have been accomplished prior to reseating of the washer 212 against the shoulder 162.

Although a further change in ratio of brake pressure delivered to the rear wheel brake cylinders to the brake pressure delivered to the front wheel brake cylinders may not be necessary, it may be desirable to provide an additional deceleration responsive valve element to terminate all additional braking pressure delivered to the rear wheels upon the attainment of a particularly high rate of deceleration. For this purpose, a permanent magnet 230 may be embedded in the body member 216 and held in place by a retainer 232. The magnet 230 magnetically attracts a steel ball 234 to hold the ball against an annular edge 236. The magnet 230 is of greater strength than the magnet 190 and, thus, will not release the ball 234 until a greater rate of deceleration has been reached than that required to unseat the ball 194. When this greater rate of deceleration has been reached, however, the ball 234 will unseat and move against the mouth of the outlet opening 156 to prevent the displacement of further fluid to the rear wheel brake cylinders. It will be seen that prior to closure or unseating of the ball 234, fluid may pass around the ball 234 by means of a series of circumferentially arranged axially extending slots 238 formed in the body member 216.

The braking force delivered to the rear wheels of the vehicle by the use of the device of FIG. 3 will be that represented by line C of FIG. 2 and previously described in connection with the device of FIGURE 1.

It should be mentioned that the spring 86 of the first embodiment of the invention and the spring 206 of the second embodiment both must be properly selected to obtain the maximum advantage from the device of the invention. These springs begin to "pay out" at point $a$ on the curve of FIG. 2 and should be substantially paid out when point $b$ is reached. If a spring of improper strength or rate is selected or if the spring is excessively compressed, then a deviation from the desired curve may result. For cars having varying weight transfer characteristics, different springs should desirably be used, although approximate results may be achieved by the use of springs approximately rated to the particular car in which the device is used.

The device of the present invention permits the use of a deceleration valve element to change the ratio at which fluid pressure is transmitted by the device of the present invention, without a marked drop in fluid pressure delivered to the rear brakes upon the actuation of the valve element, as has been discovered to be the case in devices heretofore proposed. Thus, the devices of the present invention are operable to smoothly reduce the proportion of fluid pressure delivered to the rear brakes without an unnecessary loss in braking effort at the rear wheels. The devices of the present invention also possess other significant advantages. The use of two valves in a single unit permits a very close approximation of the theoretically perfect curve. The first valve may provide for greater rear wheel braking than would be permissible in a device having a single valve. By not immediately changing to the final ratio desired for maximum effort braking, greater use is made of the rear brakes during medium effort stops—a range in which most stops are actually made. Therefore, excessive wear and possible fading of the front brakes is markedly alleviated. Furthermore, if fading of the front brakes does occur as a result of the greater braking forces applied to them, the operation of the second valve will permit the application of unlimited additional braking pressure to the front brakes to overcome the loss of friction in the front brakes without any additional increase in the pressure applied to the rear brakes.

While it will be apparent that the preferred embodiments herein illustrated are well calculated to fulfill the objects above stated, it will be appreciated that the invention is susceptible to modification, variation and change without departing from the proper scope or fair meaning of the subjoined claims.

What is claimed is:

1. A pressure proportioning device adapted to be interposed between the master cylinder and a brake cylinder of a vehicular hydraulic brake system, said device including differential area piston means, said piston means having areas exposed to fluid from said master cylinder, a valve arranged for actuation after a predetermined initial brake application and operable to change the areas of said piston means exposed to master cylinder pressure, said piston means having at least one fluid displacing portion operable to pressurize fluid at said brake cylinder by movement thereof in a given direction upon an increase in master cylinder pressure after actuation of said valve, and resilient means arranged for loading by said piston means during a substantial portion of said initial brake application and operable to give up energy in a direction assisting said fluid displacing portion in pressurizing fluid at said brake cylinder after actuation of said valve.

2. A pressure proportioning device adapted to be interposed between the master cylinder and the rear brake cylinders of the hydraulic brake system of a vehicle having front and rear brakes, said device including differential area piston means, said piston means having areas exposed to fluid from said master cylinder, a valve arranged for closure after a predetermined initial brake application and operable to limit the areas of said piston exposed to master cylinder pressure, said piston means having at least one fluid displacing portion operable to pressurize fluid at said rear brake cylinders by movement thereof in a given direction upon an increase in master cylinder pressure after actuation of said valve, and resilient means arranged for loading by said piston means during a substantial portion of said initial brake application and operable to give up energy in a direction assisting said fluid displacing portion in pressurizing fluid at said rear brake cylinders after actuation of said valve.

3. A pressure proportioning device adapted to be interposed between the master cylinder and a brake cylinder of a vehicular hydraulic brake system, said device including differential area piston means, said piston means having areas exposed to fluid from said master cylinder, a valve arranged for actuation after a predetermined initial brake application and operable to change the areas of said piston means exposed to master cylinder pressure, said piston means having at least one fluid displacing portion operable to pressurize fluid at said brake cylinder by movement thereof in a given direction upon an increase in master cylinder pressure after actuation of said valve, and a spring arranged for loading by said piston means during a substantial portion of said initial brake application and operable to give up energy in a direction assisting said fluid displacing portion in pressurizing fluid at said brake cylinder after actuation of said valve.

4. A pressure proportioning device adapted to be interposed between the master cylinder and a brake cylinder of a vehicular hydraulic brake system, said device including differential area piston means arranged for actuation by fluid from said master cylinder, bypass means providing a path for the direct transmission of fluid pressure from said master cylinder to said brake cylinder past said piston means, a valve arranged to close said bypass after a predetermined initial brake application, said piston means having at least one fluid displacing portion operable to pressurize fluid at said brake cylinder by movement thereof in a given direction upon an increase in master cylinder pressure after closure of said bypass, and resilient means arranged for loading by said piston means during a substantial portion of said initial brake application and operable to give up energy in a direction assisting said fluid displacing portion in pressurizing fluid at said brake cylinder.

5. A pressure proportioning device adapted to be interposed between the master cylinder and a brake cylinder of a vehicular hydraulic brake system, said device including differential area piston means, said piston means having areas exposed to fluid from said master cylinder, a first valve arranged for actuation after a first predetermined initial brake application and operable to change the areas of said piston means exposed to master cylinder pressure, said piston means having at least one fluid displacing portion operable to pressurize fluid at said brake cylinder by movement thereof in a given direction upon an increase in master cylinder pressure after actuation of said valve, resilient means arranged for loading by said piston means during a substantial portion of said initial brake application and operable to give up energy in a direction assisting said fluid displacing portion in pressurizing fluid at said brake cylinder after actuation of said valve means, and a second valve arranged for actuation subsequent to the actuation of said first valve and operable to prevent any additional pressurization of said brake cylinder by said piston means upon the actuation thereof.

References Cited in the file of this patent
UNITED STATES PATENTS

| | | |
|---|---|---|
| 2,903,100 | Freeman | Sept. 8, 1959 |
| 2,991,797 | Baldwin | July 11, 1961 |